(12) United States Patent
Kennedy et al.

(10) Patent No.: US 9,652,048 B2
(45) Date of Patent: May 16, 2017

(54) DIVISIBLE KEYBOARD FOR IMPRECISE INPUT

(75) Inventors: Benedict John Howard Kennedy, Borden (GB); James Morley-Smith, High Wycombe (GB)

(73) Assignee: Symbol Technologies, LLC, Holtsville, NY (US)

( * ) Notice: Subject to any disclaimer, the term of this patent is extended or adjusted under 35 U.S.C. 154(b) by 1374 days.

(21) Appl. No.: 13/204,828

(22) Filed: Aug. 8, 2011

(65) Prior Publication Data

US 2013/0038536 A1    Feb. 14, 2013

(51) Int. Cl.
*G06F 3/02* (2006.01)

(52) U.S. Cl.
CPC .................... *G06F 3/0202* (2013.01)

(58) Field of Classification Search
CPC ............ G06F 3/02; G06F 3/041; G06F 3/048; G09G 5/00
USPC .................... 345/168–169; 715/815
See application file for complete search history.

(56) References Cited

U.S. PATENT DOCUMENTS

| 2006/0256088 A1* | 11/2006 | Kong | ............................. 345/168 |
| 2008/0048986 A1* | 2/2008 | Khoo | ............................. 345/168 |
| 2010/0097321 A1* | 4/2010 | Son et al. | ..................... 345/169 |
| 2011/0083104 A1* | 4/2011 | Minton | ......................... 715/815 |

OTHER PUBLICATIONS

Greaney, D., The Simpsons: Episode 3F05: "King-Size Homer," Nov. 5, 1995.

* cited by examiner

*Primary Examiner* — Tony N Ngo

(57) ABSTRACT

A sectionable keyboard is described. A mobile device including the keyboard includes a processor. A memory is coupled to the processor. A software application capable of executing on the processor is stored in the memory. The keyboard is coupled to the processor and provides input from the user. The keyboard includes a plurality of keys that is separated into a plurality of sections. Each section includes a multiple of physically adjacent keys such that a selection of the input is chosen when two or more of the physically adjacent keys in each section are activated simultaneously. The physically adjacent keys in each of the sections correspond to a different input.

14 Claims, 4 Drawing Sheets

DIVISIBLE KEYBOARD FOR IMPRECISE INPUT

TECHNICAL FIELD

The invention relates generally to a keyboard for a mobile device. The keyboard can be a physical keyboard or a virtual keyboard that can be displayed on a touch screen display.

BACKGROUND

Keypads for mobile devices are generally small due to the size of the devices. Users with large fingers often inadvertently select multiple keys when only a single key is desired. In some larger devices, the space between keys is enlarged in an effort to mitigate the problem. In some devices, the number of keys on the keyboard is reduced in order to enlarge the remaining keys. However, many mobile devices, such as smart cellular telephones, include a standard QWERTY-type keyboard with small closely-spaced individual keys.

SUMMARY

In one aspect, the invention is embodied in a method including executing a software application on a processor of a computing device. The software application requires an input from a user via a keyboard. A plurality of keys of the keyboard is separated into a plurality of sections. Each section includes multiple physically adjacent keys of the keyboard such that a selection of the input is chosen when two or more of the physically adjacent keys in each of the sections are activated simultaneously. The multiple of physically adjacent keys in each of the sections correspond to a different input. The number of sections can be more than two. The computing device can be a mobile computer.

In one embodiment, the processor calculates a location coordinate corresponding to the physical location of the activated multiple physically adjacent keys. The location coordinate can be mapped on a display of the computing device. The method further includes activating the multiple physically adjacent keys simultaneously to select the input corresponding to one of the plurality of sections. The input can include a binary input. The binary input can include yes/no, up/down, left/right, on/off, light/dark, in/out, forward/back, insert/delete and/or top/bottom.

In another aspect, the invention is embodied in an apparatus including a processor. A memory is coupled to the processor for storing a software application capable of executing on the processor. The software application requires an input from a user. A keyboard is coupled to the processor for providing the input from the user. The keyboard includes a plurality of keys separated into a plurality of sections. Each section includes multiple physically adjacent keys of the keyboard such that a selection of the input is chosen when two or more of the physically adjacent keys in each section are activated simultaneously. The multiple physically adjacent keys in each of the sections correspond to a different input. The number of sections can be more than two.

In one embodiment, the processor calculates a location coordinate corresponding to the physical location of the activated multiple physically adjacent keys. A display coupled to the processor maps the location coordinate. The input can include a binary input. The binary input can include yes/no, up/down, left/right, on/off, light/dark, in/out, forward/back, insert/delete and/or top/bottom. The apparatus can be a mobile computing device.

In another aspect, the invention is embodied in a method including executing a software application on a processor of a computing device. The software application requires a binary input from a user via a keyboard. A plurality of keys of the keyboard is separated into two sections. Each section includes multiple physically adjacent keys of the keyboard such that a selection of the binary input is chosen when two or more of the physically adjacent keys in each section are activated simultaneously. The multiple of physically adjacent keys in each of the two sections correspond to a different selection of the binary input.

In one embodiment, the processor calculates a location coordinate corresponding to the physical location of the activated multiple physically adjacent keys. A display coupled to the processor maps the location coordinate. In one embodiment, the binary input can include yes/no, up/down, left/right, on/off, light/dark, in/out, forward/back, delete/insert and top/bottom. In one embodiment, the user activates the multiple physically adjacent keys simultaneously to select the binary input corresponding to one of the two sections.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

Figure 1:
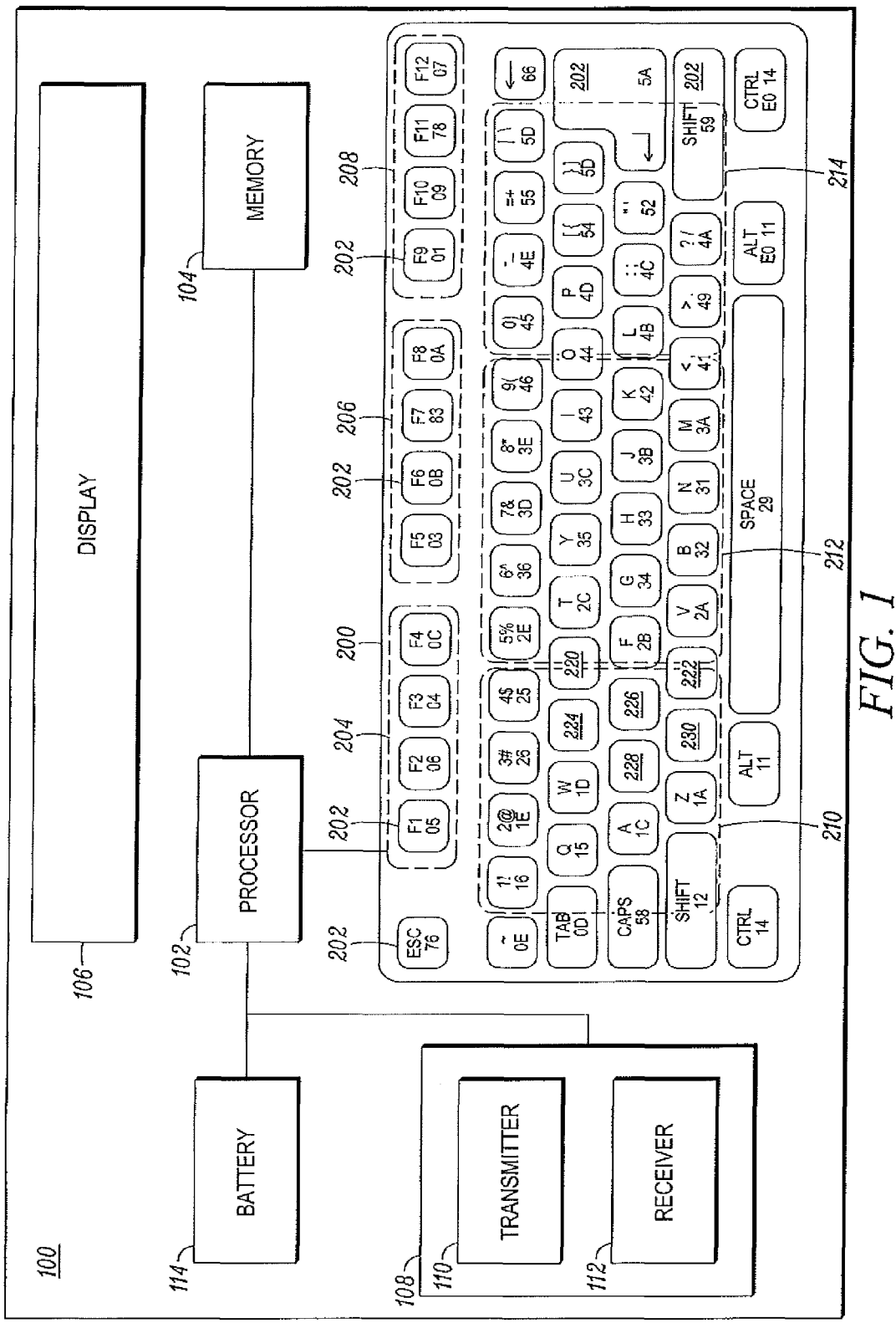
FIG. 1 illustrates a block diagram of a mobile device having a keyboard according to an exemplary embodiment.

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional keyboards, need not, and are not, described in detail herein.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For example, one approach for creating a keyboard is to employ a printed circuit board having contact domes that provide tactile feedback when a user actuates a key of the keypad. Skilled artisans will appreciate that fabricating printed circuit boards having contact domes for keyboards is well known in the art and will not be discussed in detail herein. Additionally, although embodiments of QWERTY keyboards will be discussed herein, skilled artisans will appreciate that any keyboard format can be used to practice the invention.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to mobile device keyboards. The term keyboard is used herein interchangeably with the term keypad. The keyboard can be a QWERTY-type keyboard, a number-type keyboard, or any other keyboard. The keyboard can be any suitable shape. In an exemplary embodiment, a keyboard according to the invention is a standard keyboard for input by a user.

In one embodiment, the keyboard is coupled to a processor and provides input from the user. The keyboard includes a plurality of keys separated into a plurality of sections. Each section includes two or more physically adjacent keys such that a selection of the input is chosen when two or more of the physically adjacent keys in each section are activated simultaneously. The multiple physically adjacent keys in each of the sections correspond to a different input.

The exemplary embodiments describe a keyboard that can be used on a mobile device, such as a mobile computer, notebook, smart phone, personal digital assistant, feature phone, or any other mobile device that employs a physical or virtual keyboard.

In one embodiment, a keyboard according to the invention can be used by a user of a mobile device is lacking the dexterity to press a small specific key to input binary data (such as yes/no). For example, glove-wearing users can lose dexterity relative to interfacing with a small keyboard and are likely to inadvertently press multiple keys simultaneously.

In another example, a mail carrier wearing winter gloves views a list of deliveries displayed on her mobile device. Instead of removing her glove each time she selects a delivery on the list, she can press multiple keys in a predetermined section of the device's keypad to select the currently highlighted delivery on her list. Alternatively, she can select another section of the keypad to scroll up or down the list.

FIG. 1 illustrates a block diagram of a mobile device 100 having a keyboard 200 according to an exemplary embodiment. The mobile device 100 includes a processor 102 that is coupled to the keyboard 200. The processor 102 receives input signals from the keyboard 200. The input signals will be discussed in more detail herein. The processor 102 controls various system components and executes instructions from software applications residing in a memory 104. A display 106 is coupled to the processor 102.

The mobile device 100 contains, among other components, a transceiver 108 including transmitter circuitry 110 and receiver circuitry 112, and a battery 114. The mobile device 100 can also include an antenna (not shown), one or more I/O devices (not shown), one or more communication interfaces (not shown), a data capture device (not shown), and an optional removable storage (not shown). The mobile device 100 is preferably an integrated unit containing the elements depicted in FIG. 1, as well as any other element necessary for the mobile device 100 to function.

The processor 102 can include one or more microprocessors, microcontrollers, state machines, logic circuitry, or any other device or devices that process information based on operational or programming instructions. In alternate embodiments, the processor 102 can be a general purpose microprocessor or a customizable integrated circuit such as an application-specific integrated circuit (ASIC). In one embodiment, the processor includes a digital signal processor (DSP).

Such operational or programming instructions are preferably stored in the memory 104. The memory 104 can be an IC memory chip containing any form of random access memory (RAM) or read only memory (ROM), a floppy disk, a compact disk (CD) ROM, a hard disk drive, a digital versatile disk (DVD), a flash memory card or any other medium for storing digital information. The memory 104 can reside on an erasable programmable read only memory (EPROM). The mobile device 100 can include an optional removable memory, such as a secure digital (SD) memory card, for example.

Skilled artisans will recognize that when the processor 102 has one or more of its functions performed by a state machine or logic circuitry, the memory 104 containing the corresponding operational instructions may be embedded within the state machine or logic circuitry. Operations performed by the processor 102 as well as the mobile device 100 are described in detail below.

The transmitter circuitry 110 and the receiver circuitry 112 enable the mobile device 100 to respectively transmit and receive communication signals. In this regard, the transmitter circuitry 110 and the receiver circuitry 112 include circuitry to enable wireless transmissions. The implementations of the transmitter circuitry 110 and the receiver circuitry 112 depend on the implementation of the mobile device 100 and the devices with which it is to communicate. For example, the transmitter and receiver circuitry 110, 112 can be implemented as part of the communication device hardware and software architecture in accordance with known techniques. One of ordinary skill in the art will recognize that most, if not all, of the functions of the transmitter or receiver circuitry 110, 112 can be implemented in a processor, such as the processor 102. However, the processor 102, the transmitter circuitry 110, and the receiver circuitry 112 have been partitioned herein to facilitate a better understanding of the functions of these elements.

The battery 114 provides current to the processor 102, the display 106, the transceiver 108, and any other required component to power the mobile device 100. The battery 114 can be a disposable battery or a rechargeable battery. For example, the battery 114 can be a lithium ion battery or a nickel-cadmium (NiCd) battery. Any suitable battery can be used. The mobile device 100 can also include a connector (not shown) that accepts a power adapter for use with standard alternating current (AC) power.

In one embodiment, the mobile device 100 includes a user interface. The user interface is configured to allow a user to interact with the mobile device 100. The user interface can include the display 106. The display 106 can be a liquid crystal display (LCD). The display 106 is configured to provide visual feedback to the user during operation of the mobile device 100. The display 106 can include touch screen functionality. The mobile device 100 also includes operating system software that can reside in the memory 104. The operating system software can include a graphical user interface (GUI) that is displayed on the display 106.

The user interface can also include the keyboard 200. The keyboard 200 is configured to allow the user to input various commands into the mobile device 100. Additional input devices can also be included with the mobile device 100, such as a numerical keypad, control buttons, a thumbwheel, a trackball, a touch pad, the touch screen, a microphone or any other suitable input device.

The keyboard 200 is coupled to the processor 102 for providing input from a user. The keyboard 200 comprises a plurality of keys 202 separated into a plurality of sections 204, 206, 208, 210, 212, and 214. Each section 204, 206, 208, 210, 212, and 214 includes a multiple of physically adjacent keys 202. The processor recognizes a selection of the input when two or more of the physically adjacent keys 202 in each section 204, 206, 208, 210, 212, and 214 are activated substantially simultaneously. In one embodiment, the multiple physically adjacent keys 202 in each of the sections 204, 206, 208, 210, 212, and 214 correspond to a different input.

In operation, a software application executing on the processor 102 recognizes at least six inputs from the keyboard 200 corresponding to the six sections 204, 206, 208, 210, 212, and 214. For example, simultaneous activation of two or more of the keys 202 in section 204 indicates to the processor 102 that the user has selected the input corresponding to section 204.

In one embodiment, the processor 102 calculates a location coordinate corresponding to the physical location of the activated multiple physically adjacent keys. The processor 102 can then map the location coordinate on the display 106 of the computing device 100. The location coordinate mapping will be discussed in more detail herein with reference to FIG. 4.

Figure 2:
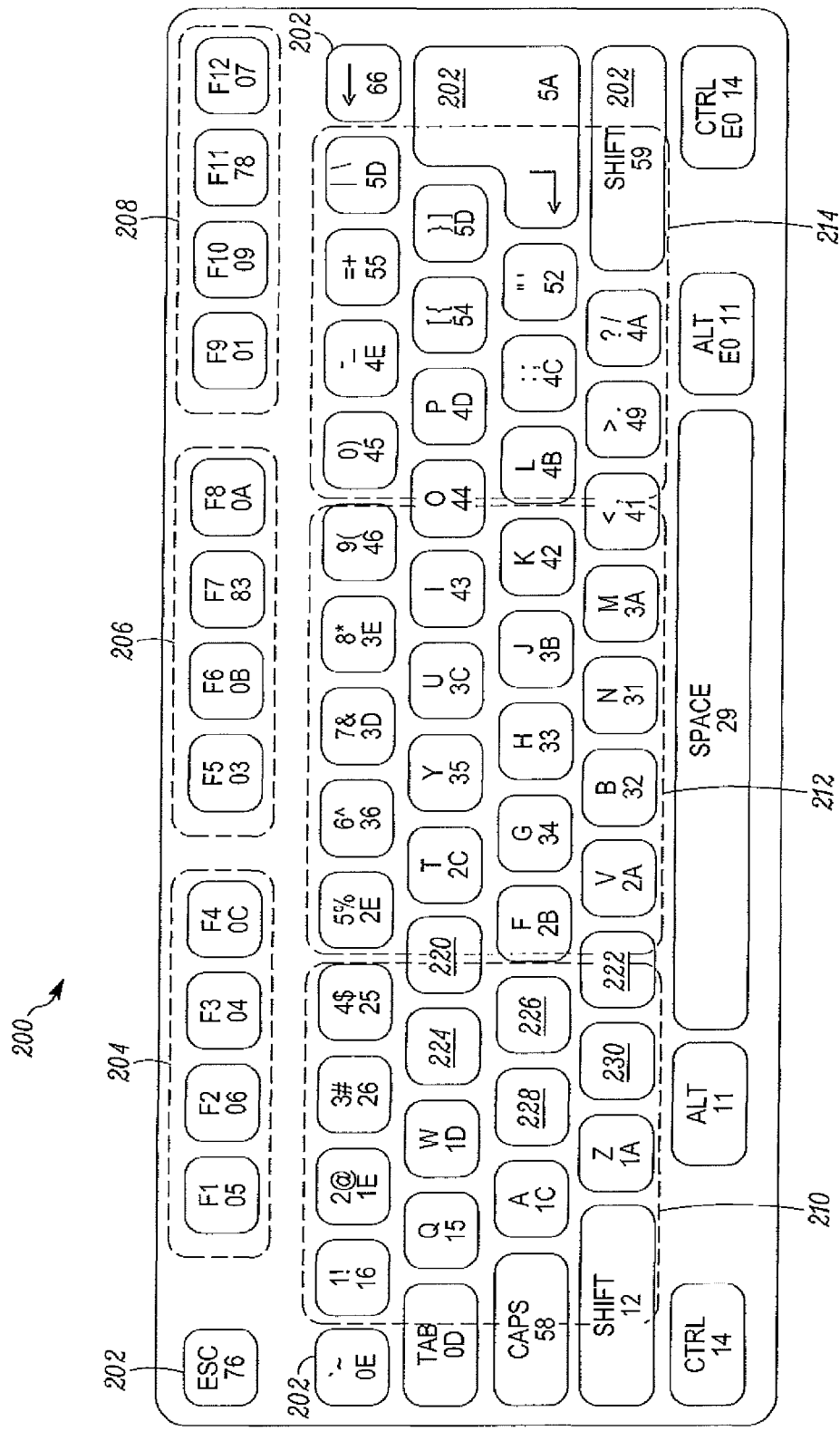
FIG. 2 illustrates a top view of the keyboard of FIG. 1.

FIG. 2 illustrates a top view of the keyboard 200 according to an exemplary embodiment. The keyboard 200 includes the plurality of keys 202. In this embodiment, the keyboard 200 is a QWERTY-type keyboard. However, any suitable keyboard style can be used. The keys 202 can be fabricated from plastic, metal, ceramic, or any other suitable material.

As previously described, the keyboard 200 can be separated into two or more sections. Although the keyboard 200 is illustrated having six sections 204, 206, 208, 210, 212, and 214, skilled artisans will appreciate that the keyboard 200 can be separated into any desired number of sections. Additionally, the number of keys 202 assigned to each section can also vary. In one embodiment, the number of keys 202 in each section is equal. In another embodiment, the number of keys 202 in each section is different. For example, the number of keys 202 in section 204 is the same as the number of keys 202 in section 206, but different than the number of keys 202 in section 210.

In one embodiment, various sections can share keys 202. For example, section 210 and section 212 share keys 220 and 222. In one embodiment, the processor 102 (FIG. 1) will interpret an activation of a section having a shared key with another section based on the number of keys simultaneously activated in that section. For example, if a user simultaneously activates keys 224, 226, 228, 230 and shared key 222, the processor 102 will interpret the input as a selection of section 210.

In one embodiment, if a user simultaneously activates substantially the same number keys in two different sections, the processor 102 interprets the input as a non-selection. The user can then reselect the desired section.

Figure 3:
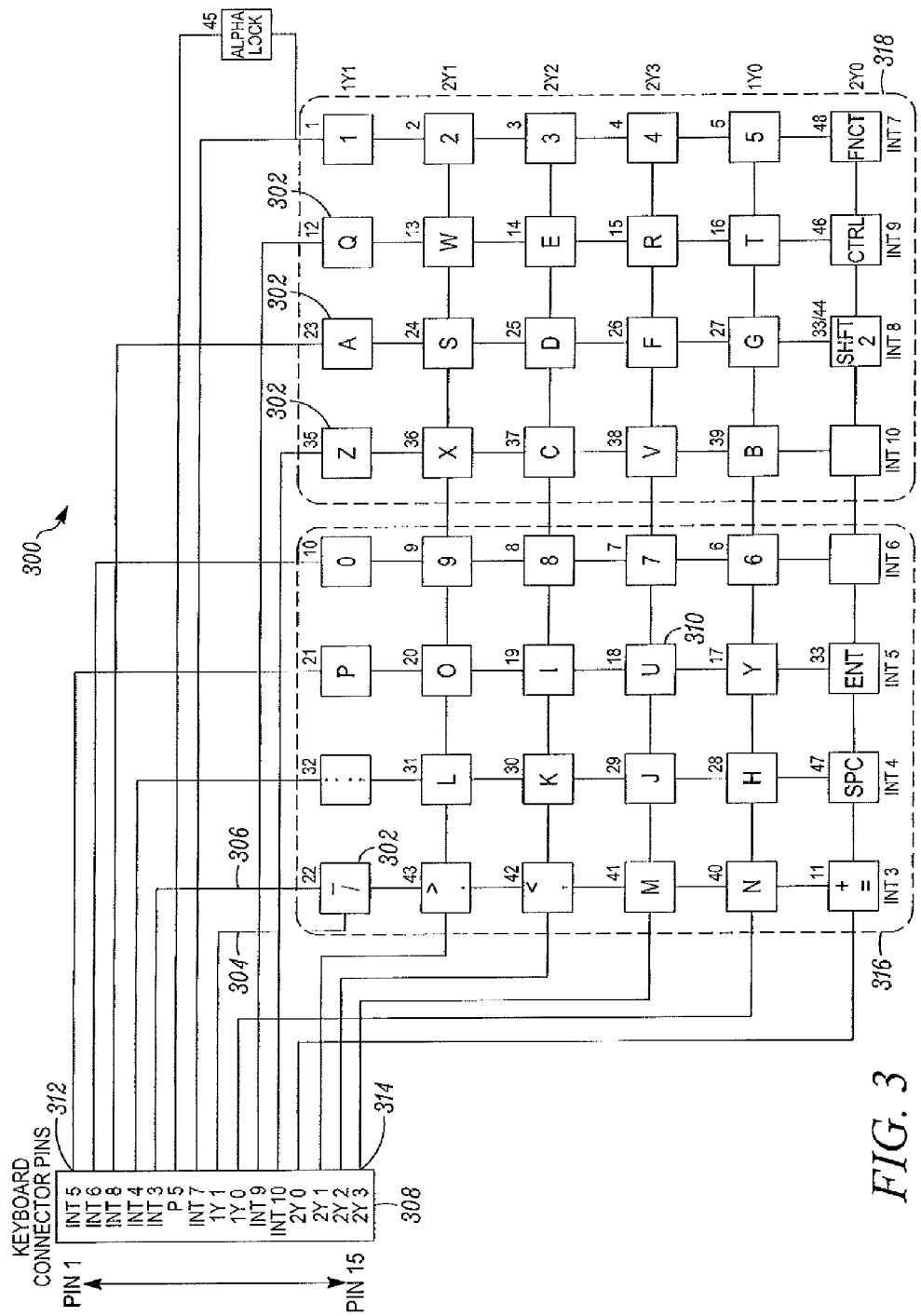
FIG. 3 illustrates a circuit diagram of a keyboard according to an exemplary embodiment.

FIG. 3 illustrates a schematic diagram of a keyboard 300 according to an exemplary embodiment. The schematic diagram illustrates that each key 302 includes a different pair of wire leads 304, 306 that terminate at a keyboard connector 308. Thus, no two keys include the same pair of wire leads 304, 306. Skilled artisans will appreciate that other keyboard circuits and keyboard connectors can also be used.

In one embodiment, when a user selects the specific key 310, the same voltage potential is measured at the keyboard connector pins 312, 314 on the keyboard connector 308. The voltage potential at the connector pins 312, 314 is interpreted by the processor 130 (FIG. 1) as a selection of specific key 310.

The keyboard 300 can be segmented into a plurality of sections. In one embodiment, the keyboard 300 is segmented into two sections 316, 318 illustrated by the broken lines surrounding each section. Each of the sections 316, 318 includes twenty-four keys 302. Each section 316, 318 includes multiple physically adjacent keys 302 such that a selection of the input is chosen when two or more of the physically adjacent keys 302 in each of the sections 316, 318 are activated simultaneously.

An input from each of the two sections 316, 318 can be a binary input. For example, the binary input can be yes/no, up/down, left/right, on/off, light/dark, in/out, forward/back, insert/delete and top/bottom. Thus, a selection of section 316 can indicate a "yes" input while a selection of section 318 can indicate a "no" input.

Figure 4:
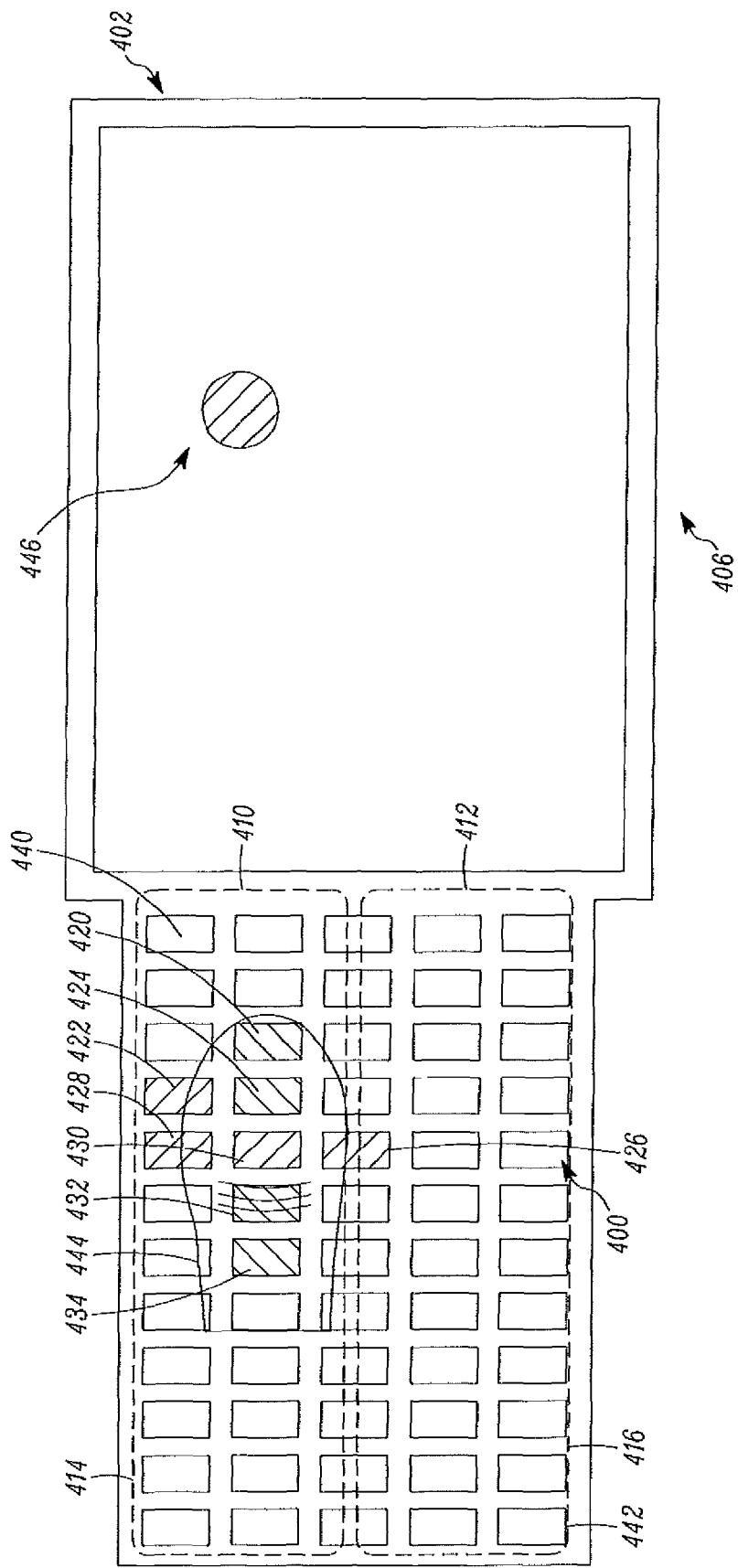
FIG. 4 illustrates a mobile device having a keyboard according to an exemplary embodiment.

FIG. 4 illustrates a mobile device 402 having a keyboard 400 according to an exemplary embodiment. The device 402 can be a mobile device having a display 406. The display 406 can be a touch screen display. In one embodiment, the keyboard 400 can be divided into four sections 410, 412, 414, 416. In practice, the keyboard 400 can be divided into any number of desired sections. Simultaneous multiple key presses in each of those sections would be interpreted by the processor (not shown) of the device 402 as separate inputs.

In one embodiment, the invention can be used to map an input of the keyboard 400 to a graphical location on the display 406. For example, the keyboard 400 includes twelve rows of five keys. If a user presses keys 420, 422, 424, 426, 428, 430, 432, and 434 in the top left corner of the keyboard 400, the processor can calculate a coordinate from the multiple key presses and translate that coordinate to a coordinate on the display 406 of the mobile device 402.

In one embodiment, this translation is determined as follows. The keyboard 400 is a rectangular twelve by five keyboard having sixty keys. Assigning coordinates [0, 0] to the top left key 440 of the keyboard 400 and [5, 12] to the bottom right key 442 of the keyboard 400 provides a coordinate map of the keys of the keyboard 400.

A finger 444 of a user substantially simultaneously presses eight keys at coordinates [1, 3], [0, 4], [1, 4], [2, 4], [0, 5], [1, 5], [2, 6], and [2, 7]. The processor (not shown) can determine a calculated center position of the simultaneous button presses. In one embodiment, the processor calculates the center position as follows.

$$\text{Center Position} = \{[\Sigma X_{coord}/\text{number of keys}], [\Sigma Y_{coord}/\text{number of keys}]\}$$

$$= \{[(1+0+1+2+0+1+2+2)/8],$$

$$[(3+4+4+4+5+5+6+7)/8]\}$$

$$= [9/8, 38/8]$$

$$\approx [1, 5].$$

The processor can then translate the calculated center coordinate on the keyboard to a corresponding coordinate on the display 406. In one embodiment, the translation can be calculated as follows.

Let $X_1$=keyboard X coordinate
Let $Y_1$=keyboard Y coordinate
Let $X_2$=display X coordinate
Let $Y_2$=display Y coordinate X Coordinate translation algorithm: $X_2 = X_1 * (\text{\# pixel columns on display}/\text{\# of key columns on keyboard})$ Y Coordinate translation algorithm: $Y_2 = Y_1 * (\text{\# pixel rows on display}/\text{\# of key rows on keyboard})$ Therefore, with a display having a resolution of 640×480 pixels:

$$X_2 = 1*(640/5)$$

$$X_2 = 1*(128)$$

$$X_2 = 128$$

$$Y_1 = 5*(480/12)$$

$$Y_1 = 5*(40)$$

$$Y_1 = 200$$

Thus, the processor calculates the display pixel coordinate as [128, 200], corresponding to the circle 446 on the display 406.

In general, the processor includes processing logic configured to carry out the functions, techniques, and processing tasks associated with the operation of the data capture device. Furthermore, the steps of a method or algorithm described in connection with the embodiments disclosed herein may be embodied directly in hardware, in firmware, in a software module executed by the processor, or any combination thereof. Any such software may be implemented as low level instructions (assembly code, machine code, etc.) or as higher-level interpreted or compiled software code (e.g., C, C++, Objective-C, Java, Python, etc.).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A method comprising:
    separating a plurality of keys of a keyboard into a plurality of sections, each section comprising multiple physically adjacent keys of the keyboard,
    assigning a unique input to each of the plurality of sections, such that simultaneous activation of any two or more of the multiple physically adjacent keys of one of the sections indicate an input that is different from another input indicated by simultaneous activation of any other two or more of the multiple physically adjacent keys of any of the other sections;
    selecting the unique input indicated by simultaneous activation of any two or more of the multiple physically adjacent keys in one of the sections; and
    executing a software application by a processor of a computing device based on the selected unique input, wherein,
        when the simultaneously activated any two or more physically adjacent keys include a physically adjacent key that is shared between at least two of the plurality of sections, the method further comprising:
            determining a quantity of physically adjacent keys that are simultaneously activated in each of the at least two of the plurality of sections, identifying a section from the at least two of the plurality of the sections based on the determined quantity of physically adjacent keys, selecting the unique input assigned to the identified section, and executing the software application by the processor of the computing device based on the selected unique input assigned to the identified section.

2. The method of claim 1 further comprising calculating a location coordinate corresponding to the physical location of the activated multiple physically adjacent keys.

3. The method of claim 2 further comprising mapping the location coordinate on a display of the computing device.

4. The method of claim 1 wherein the unique input comprises a binary input.

5. The method of claim 4, wherein the binary input is chosen from the group consisting of yes/no, up/down, left/right, on/off, light/dark, in/out, forward/back, insert/delete and top/bottom.

6. An apparatus comprising:

a processor;

a memory coupled to the processor for storing a software application capable of executing on the processor; and a keyboard coupled to the processor, the keyboard comprising a plurality of keys separated into a plurality of sections, each section comprising multiple physically adjacent keys of the keyboard, wherein, the processor assigns a unique input to each of the plurality of the sections, such that simultaneous activation of any two or more of the multiple physically adjacent keys of one of the sections indicate an input that is different from another input indicated by simultaneous activation of any other two or more of the multiple physically adjacent keys of any of the other sections, the processor selects the unique input indicated by simultaneous activation of any two or more of the multiple physically adjacent keys in one of the sections and executes the software application based on the selected unique input, and when the simultaneously activated any two or more physically adjacent keys include a physically adjacent key that is shared between at least two of the plurality of sections, the processor identifies a section from the at least two of the plurality of sections based on a quantity of physically adjacent keys that are simultaneously activated in each of the at least two of the plurality of sections, and selects the unique input assigned to the identified section.

7. The apparatus of claim 6, wherein the processor calculates a location coordinate corresponding to the physical location of the activated multiple physically adjacent keys.

8. The apparatus of claim 7 further comprising a display coupled to the processor for mapping the location coordinate.

9. The apparatus of claim 6, wherein the unique input comprises a binary input.

10. The apparatus of claim 9, wherein the binary input is chosen from the group consisting of yes/no, up/down, left/right, on/off, light/dark, in/out, forward/back, delete/insert and top/bottom.

11. A method comprising:

configuring a computing device to segment a keyboard into a plurality of sections, each section comprising multiple physically adjacent keys;

assigning a unique input to each of the plurality of sections of the keyboard, such that multiple sections correspond to different inputs;

in response to detecting simultaneous activation of any two or more physically adjacent keys of the keyboard, identifying a section from the plurality of sections of the keyboard that comprises the simultaneously activated two or more physically adjacent keys;

selecting the unique input assigned to the identified section of the keyboard; and executing an application in the computing device based on the selected unique input, wherein, when the simultaneously activated any two or more physically adjacent keys include a physically adjacent key that is shared between at least two of the plurality of sections, the method further comprising:

determining a quantity of physically adjacent keys that are simultaneously activated in each of the at least two of the plurality of sections, identifying a section from the at least two of the plurality of the sections based on the determined quantity of physically adjacent keys, selecting the unique input assigned to the identified section from the at least two of the plurality of the sections, and executing the application in the computing device based on the selected unique input.

12. The method of claim 11, further comprising:

calculating a location coordinate corresponding to a physical location of the activated two or more physically adjacent keys; and mapping the location coordinate on a display of the computing device.

13. The method of claim 11, wherein the unique input assigned to each section comprises a binary input.

14. The method of claim 13, wherein the binary input is chosen from the group consisting of yes/no, up/down, left/right, on/off, light/dark, in/out, forward/back, delete/insert and top/bottom.

* * * * *